Figure 1:
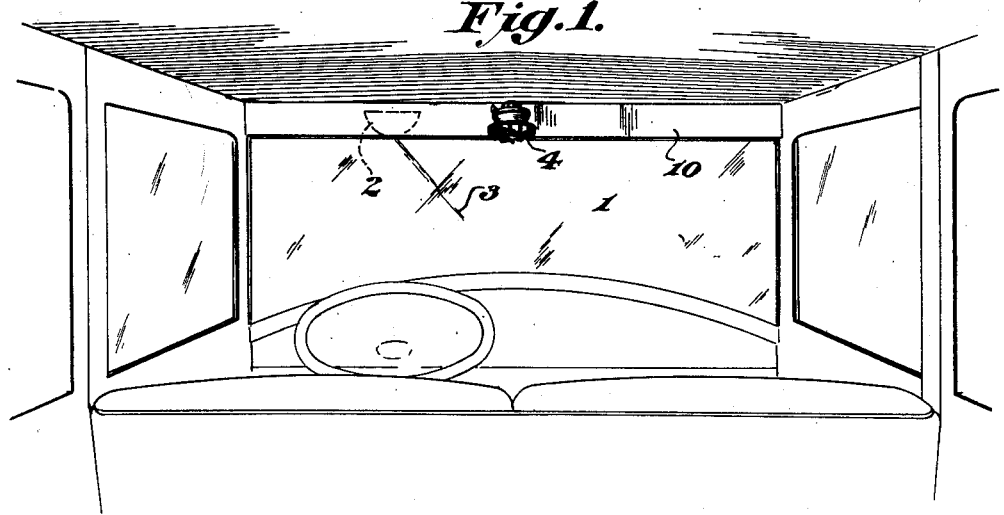

Jan. 28, 1930.  J. R. OISHEI ET AL  1,745,114
WINDSHIELD CLEANER
Filed Oct. 6, 1927

Inventor
John R. Oishei
Henry Hueber
by Barton A. Beard
Attorney

Patented Jan. 28, 1930

1,745,114

UNITED STATES PATENT OFFICE

JOHN R. OISHEI AND HENRY HUEBER, OF BUFFALO, NEW YORK, ASSIGNORS TO TRICO PRODUCTS CORPORATION, OF BUFFALO, NEW YORK

WINDSHIELD CLEANER

Application filed October 6, 1927. Serial No. 224,501.

This invention relates to a windshield cleaning apparatus or device and more particularly to a device for maintaining the interior surface of the windshield or windows of a closed car free from frost or cloudiness due to the condensation or collection of moisture on the inner surfaces of said transparencies.

Heretofore considerable attention has been given to the cleaning of the exterior surface of a windshield by the perfecting of a windshield cleaner to effectively remove the moisture therefrom, but when driving in a closed car during cold weather the motorist is often confronted with the annoyance and disadvantage of having the windows and more especially the windshield beclouded by the condensation of the moisture from the air within the car upon the inner surface of said windshield, thereby making visibility therethrough exceedingly obscure and driving conditions quite dangerous. In bitter cold weather the vapors which condense upon the windshield almost immediately become frozen thereby creating a frosted coating which can not be removed except through a clean scraping action or by the application of heat to the cold windshield.

Attempts have been made to apply heat or warm air to the inner surface of the windshield for removing and maintaining such inner surface free from vapor-condensation, but the constructions heretofore proposed have been cumbersome and inapposite for attachment to or association with windshield or motor vehicle constructions. The application of heat electrically to a windshield is obviously a considerable drain upon the storage battery of the vehicle.

The present invention has for its objects to provide, in combination with the windshield, a device for keeping the interior side of the windshield free from condensed vapors which might otherwise frost and cloud the same and thereby obscure the vision therethrough; to provide means for creating a disturbed condition of the atmosphere adjacent the inner surface of the windshield whereby a current of air will be caused to pass over or across the inner side of the windshield; to provide a suction operated windshield fan of simple and practical construction which may readily be mounted or arranged at the inner side of the windshield for directing a flow of air across the windshield; to provide a current-creating device which may be adjustable for causing a current to pass over a selected or predetermined area of the windshield; and to provide a fanning device which can be operated in conjunction with the exterior windshield cleaner for maintaining clear visibility through the windshield by co-acting with said exterior windshield cleaner in retaining both the inner and the outer surfaces of the windshield glass free from beclouding or obscuring moisture.

Figure 2:
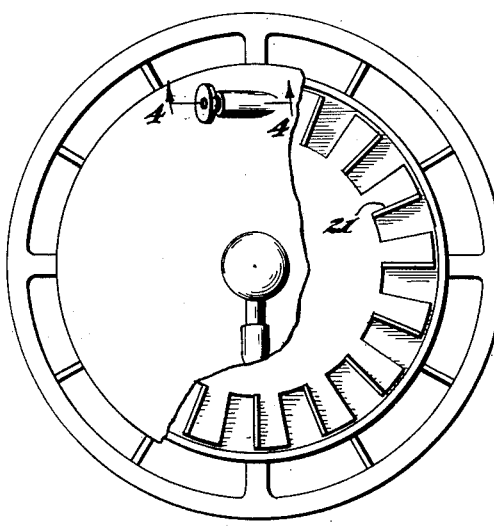
Figure 3:
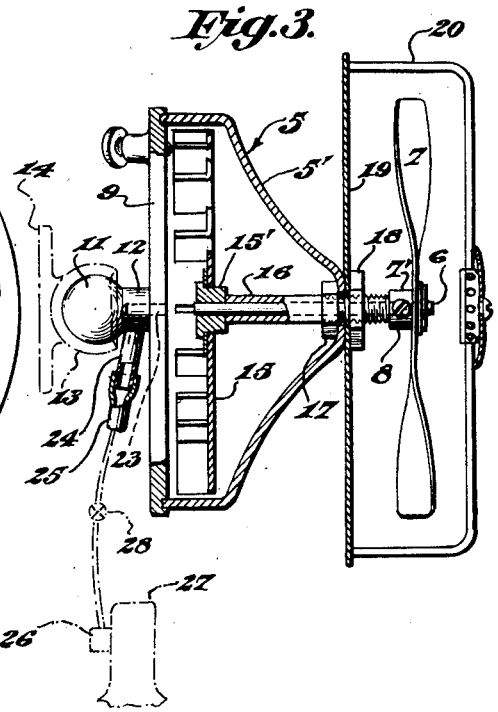
Figure 4:
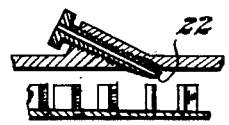

The invention will also be found to reside in the features of construction and the arrangement and combination of parts hereinafter more clearly set forth, reference being had to the accompanying drawing wherein, Fig. 1 is an interior view of a closed automobile equipped with the present invention, Fig. 2 is a rear elevation of the improved suction-operated fan, a portion of the casing being broken away, Fig. 3 is an axial section through the fan device depicting diagrammatically the suction line to the engine, and Fig. 4 is a detailed section on line 4—4 of Fig. 2.

Referring more in detail to the accompanying drawing, a windshield 1 is provided with the usual windshield cleaner motor 2 for sweeping the wiper blade 3 across the exterior side of the windshield to clean a definite exterior area or zone through which clear visibility may be obtained.

When driving in a closed car the visibility through the exteriorly cleaned zone or area of the windshield is frequently obscured by the clouding of the inner surface of the windshield upon the condensing of vapors thereon. It has been found that by agitating the atmosphere or creating a current or flow of atmosphere adjacent the inner surface of the windshield that this clouding effect can be avoided regardless of whether the current of air is heated or not. It is therefore important to provide a current-producing medium of a simple and economical type or character and which can be installed on the interior of the car so that it will not be conspicuous or out of harmony with the interior finishing of the car. With this in mind there is provided a fanning device which is preferably mounted at the upper side of the windshield, within the car, so that a current of air may be forced downwardly across the windshield glass. Such a device is generally indicated at 4 in Fig. 1 and comprises a motor casing 5 from which protrudes a motor driven shaft 6 to which is fixed the fan blades 7 by means of a set screw 8 or otherwise. The motor casing is provided with a base 9 which is adjustably secured to the header bar 10 of the windshield whereby the fan may be adjusted so as to direct a current of air across any part or selected area of the windshield. In Fig. 1 this fan is shown for directing a current of air perpendicularly down across the windshield. By reason of the adjustability in the mounting of this fan the latter may be angularly adjusted so as to direct its shaft of air to the left and directly across the windshield area which is having its exterior surface cleaned by the wiper blade 3. A simple, adjustable mounting for this motor is depicted in Fig. 3 as being of a ball and socket character, the ball part 11 being secured rigidly to the base 9 by means of a neck or standard 12, and the socket part 13 is secured to the header bar by suitable fastening screws or the like passing through the bracket extension 14, whereby the motor is adjustably supported from the header bar by means of a bracket-support embodying a ball and socket adjustment. It will thus be seen that the motor driven fan will create a flow of air across the windshield glass sufficient to prevent the condensation of moisture thereon so that the inner surface of the windshield glass will be maintained free of any obscuring or clouding moisture.

The type of motor utilized for driving the fan is preferably a suction or atmospheric air operated motor since an electrically operated motor will only place an additional load upon the storage battery of the motor vehicle. The suction operated motor herein depicted is of the turbine type and comprises a rotor or bladed wheel 15 which is fixed on the inner end of the shaft 6, said shaft being journaled in a bearing sleeve 16. The casing 5 is here illustrated as having a bell-shaped section or cap part 5' which seats directly on the base 9, and the bearing sleeve 16 projects through the central portion of the bell-shaped section 5' and is secured thereto by an inner clamping nut 17 and an outer clamping nut 18 which nuts are threaded on the sleeve to tightly embrace the bell-like casing between them. The shaft is held against longitudinal play by the hub 15' of the rotor 15 and the hub 7' of the fan 7 abutting against the opposite ends thereof. Also securely clamped between these nuts 17 and 18 is a spider 19 which supports a cage or guard 20 for inclosing the fan blades 7.

The blades 21 of the rotor are stamped from the disc constituting the wheel, these blades being turned upwardly at substantially right angles to the rear face of the wheel and arranged substantially radially thereof so that an impelling fluid directed against them will impart a driving force to the wheel or rotor. Atmospheric air is directed more or less tangentially against these blades by a nozzle 22 which is adjustable through the base 9 so as to bring the discharge end at the desired distance from said blades to regulate and obtain the desired rotor speed, the nozzle being disposed at a decided inclination as is clearly shown in Figs. 2 and 4. The exhaust from the motor casing or housing is through an axially arranged duct or passage 23 extending into the neck 12 and laterally therefrom through a nipple 24 to which latter is coupled a flexible conduit 25 leading to the source of suction, such as the intake manifold 26 of the motor vehicle engine 27 illustrated schematically in Fig. 3. The degree of suction may be readily controlled by a valve 28 interposed in the suction line 25. By bringing the exhaust out laterally through the nipple 24 the universal adjustment in the mounting of the motor is not interfered with and the amount of slack required in the suction line to accommodate for the range of adjustment of the motor mounting is reduced to a minimum.

What is claimed is:

1. In combination with the windshield and intake manifold of a motor vehicle, of a suction operated fan in fluid connection with the manifold and arranged at the interior side of the windshield for creating a current of air across the inner face of said windshield.

2. In combination with the windshield of a closed car, of a fan adjustably mounted at the inner side of the windshield for creating a current of air across the inner side of said windshield.

3. A windshield cleaner comprising a fan arranged at the rear side of a motor vehicle windshield for creating currents of air across the inner side of the windshield, said fan embodying a fluid motor having a casing and an inclosed rotor, a conduit connecting the casing to the intake manifold, and adjustable means for directing atmospheric air into the casing aganist the rotor.

4. In combination with the intake manifold of a motor vehicle engine, of a windshield cleaner comprising a fan element arranged at the inner side of the windshield for forcing a current of air across the inner face thereof to prevent moisture condensing thereupon, and a suction motor for driving the fan element and connected to the intake manifold to be operated by the suction obtaining therein during operation of the engine.

5. A windshield cleaner comprising a fan element for forcing a current of air across the inner face of the motor vehicle windshield to prevent moisture condensing thereon, a motor casing connectible to the intake manifold of the motor vehicle, and a rotor journaled in the casing and having its shaft projecting and supporting said fan element for driving the same, said casing having an air inlet arranged to inject the inflowing atmospheric air against the rotor to impel the same.

6. A windshield cleaner comprising a fan element for forcing a current of air across the inner face of the motor vehicle windshield to prevent moisture accumulating thereon, a motor casing connectible to the intake manifold of the motor vehicle, a bearing sleeve secured through one wall of the casing, a shaft journaled in the sleeve and supporting said fan element on its outer end, a rotor supported on the inner end of said shaft, said sleeve constituting the sole means of support for the shaft, rotor and fan element, and mean for operatively directing the inflowing atmospheric air against the rotor.

7. A windshield cleaner comprising a fan element for forcing a current of air across the inner face of the motor vehicle windshield to prevent mositure accumulating thereon, a motor casing connectible to the intake manifold of the motor vehicle, a bearing sleeve secured through one wall of the casing, a shaft journaled in the sleeve and supporting said fan element on its outer end, a rotor supported on the inner end of said shaft, and an atmospheric air inlet nozzle adjustable in the casing toward and from the rotor.

8. A windshield cleaner comprising a fan element for forcing a current of air across the inner face of the motor vehicle windshield to prevent moisture clouding the vision therethrough, and a fluid motor for driving said fan element, said motor including a casing connectible to a source of suction, a rotor in the casing, the motor casing and the intake manifold and a fluid injecting nozzle adjustable in the casing toward and from said rotor for determining the action of the inflowing fluid on the rotor.

9. A windshield cleaner comprising a fan element for forcing a current of air across the inner face of the motor vehicle windshield to prevent moisture condensing thereon, a suction motor for driving the fan element, said motor being adapted for fluid connection with the motor vehicle manifold, and means for universally mounting the motor with the fan element for permitting the created current of air to be directed across a selected area of the windshield.

10. A windshield cleaner fan comprising a bracket for attachment to a part of the motor vehicle, a motor and a fan element operable thereby, and a ball and socket joint between the motor and bracket permitting of a universal adjustment of the fan element for directing a current of air across the inner face of the windshield.

11. A windshield cleaner comprising a bracket, a suction operated motor, a fan element operable by the motor, said motor having a mounting standard adjustably engaged with the bracket and said standard having a suction supply passage leading therethrough to the motor, and a nipple extending laterally from the standard and communicating with the passage therethrough.

12. A windshield cleaner comprising a fluid pressure motor, a fan element operable thereby, said motor having a mounting standard extending therefrom and terminating in a ball part, a bracket having a socket adjustably receiving the ball part, and a fluid connection nipple extending laterally from the standard between the motor and said ball part and communicating through the standard for connecting the motor to a source of operating pressure.

13. A windshield cleaner comprising a motor casing, a bearing sleeve supported in a wall of the casing and extending therethrough, a shaft journalled in said sleeve and extending beyond its opposite ends, a driving member arranged within the casing and connected to the iner end of the shaft, a fan element secured to the outer end of the shaft, a fan guard enclosing the fan element and mounted on the adjacent end of the bearing sleeve, and means on the sleeve for clamping the guard thereon.

JOHN R. OISHEI.
HENRY HUEBER.

CERTIFICATE OF CORRECTION.

Patent No. 1,745,114.             Granted January 28, 1930, to

JOHN R. OISHEI ET AL.

It is hereby certified that error appears in the printed specification of the above numbered patent requiring correction as follows: Page 2, line 125, claim 3, for the misspelled word "aganist" read "against"; page 3, line 30, claim 6, for the word "mean" read "means"; line 35, claim 7, for "mositure" read "moisture"; lines 51 and 52, claim 8, strike out the words "the motor casing and the intake manifold"; line 102, claim 13, for "iner" read "inner"; and that the said Letters Patent should be read with these corrections therein that the same may conform to the record of the case in the Patent Office.

Signed and sealed this 18th day of February, A. D. 1930.

(Seal)                                                      M. J. Moore,
                                                               Acting Commissioner of Patents.